(12) United States Patent
Puchko et al.

(10) Patent No.: US 11,115,926 B2
(45) Date of Patent: Sep. 7, 2021

(54) USER NODE, A NETWORK NODE AND METHODS FOR WIRELESS COMMUNICATION

(71) Applicant: HUAWEI TECHNOLOGIES CO., LTD., Shenzhen (CN)

(72) Inventors: Oleksandr Puchko, Kista (SE); Kari Heiska, Kista (SE); Johan Christer Qvarfordt, Kista (SE); Petteri Kela, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/870,567

(22) Filed: May 8, 2020

(65) Prior Publication Data

US 2020/0275368 A1 Aug. 27, 2020

Related U.S. Application Data

(63) Continuation of application No. PCT/EP2017/083668, filed on Dec. 19, 2017.

(51) Int. Cl.
*H04W 52/02* (2009.01)
*H04W 76/28* (2018.01)
*H04W 56/00* (2009.01)

(52) U.S. Cl.
CPC ....... *H04W 52/0216* (2013.01); *H04W 52/02* (2013.01); *H04W 52/0235* (2013.01); *H04W 56/001* (2013.01); *H04W 76/28* (2018.02)

(58) Field of Classification Search
CPC ......... H04W 52/0229; H04W 52/0235; H04W 28/0215; H04W 4/06; H04W 4/08;
(Continued)

(56) References Cited

U.S. PATENT DOCUMENTS 8,331,885 B1 * 12/2012 Ben-Ari ............ H04W 52/0229
455/127.5
2008/0170551 A1 7/2008 Zaks
(Continued)

FOREIGN PATENT DOCUMENTS

CN 103327587 A 9/2013
CN 103379600 A 10/2013
(Continued)

OTHER PUBLICATIONS

Huang et al., "WUR Negotiation and Acknowledgement Procedure Follow up," doc.:IEEE 802.11-17/0342r4, pp. 1-17 (Mar. 2017).
(Continued)

*Primary Examiner* — Dung Hong
(74) *Attorney, Agent, or Firm* — Leydig, Voit & Mayer, Ltd.

(57) ABSTRACT

Methods, a user node and a network node are provided. The user node is configured to determine an indication of at least one wake-up latency of the user node, the at least one wake-up latency being a time period for the user node to wake-up and start to monitor a downlink channel transmitted by the network node of a wireless communication network; determine a message comprising the indication; and transmit the message to the network node. The network node is configured to receive from the user node a message, and set a wake-up offset for the user node based on the at least one wake-up latency comprised in the message, the wake-up offset being a time period between a wake-up signal transmission and a subsequent downlink channel transmission from the network node to the user node.

18 Claims, 3 Drawing Sheets

(58) Field of Classification Search
CPC . H04W 56/0045; H04W 52/02; H04W 76/28; H04W 8/24
See application file for complete search history.

(56) References Cited

U.S. PATENT DOCUMENTS

| | | | | |
|---|---|---|---|---|
| 2012/0275364 | A1* | 11/2012 | Anderson | H04W 52/0222 370/311 |
| 2014/0321347 | A1 | 10/2014 | Jung et al. | |
| 2014/0334366 | A1 | 11/2014 | Hsu et al. | |
| 2016/0105644 | A1* | 4/2016 | Smith | G08B 13/1966 348/159 |
| 2016/0128128 | A1* | 5/2016 | Ang | H04W 52/0235 370/311 |
| 2016/0381638 | A1* | 12/2016 | Min | H04W 52/0235 370/311 |
| 2018/0348843 | A1* | 12/2018 | de CESARE | H04W 52/0229 |
| 2019/0028967 | A1* | 1/2019 | Ahn | H04B 7/02 |
| 2019/0053160 | A1* | 2/2019 | He | H04W 52/0229 |
| 2019/0090191 | A1* | 3/2019 | Liu | H04W 4/08 |
| 2019/0103950 | A1* | 4/2019 | Liu | H04W 76/28 |
| 2019/0327679 | A1* | 10/2019 | Gupta | H04W 52/0229 |
| 2019/0349857 | A1* | 11/2019 | Kim | H04W 48/10 |
| 2020/0145921 | A1* | 5/2020 | Zhang | H04W 76/27 |

FOREIGN PATENT DOCUMENTS

| | | |
|---|---|---|
| CN | 106937367 A | 7/2017 |
| CN | 107113726 A | 8/2017 |

OTHER PUBLICATIONS

Huang, "Specification Framework for TGba," IEEE P802.11 Wireless LANs, pp. 1-7 (Aug. 2017).

"3rd Generation Partnership Project; Technical Specification Group Radio Access Network; Evolved Universal Terrestrial Radio Access (E-UTRA); Radio Resource Control (RRC); Protocol specification (Release 14)," 3GPP TS 36.331 V14.4.0, pp. 1-753, 3rd Generation Partnership Project, Valbonne, France (Sep. 2017).

"WF on UE Power Saving with PDCCH Monitoring in CDRX," 3GPP TSG RAN WG1 NR Ad-Hoc #2, Qingdao, P.R. China, R1-1711994, pp. 1-3, 3rd Generation Partnership Project, Valbonne, France (Jun. 26-30, 2017).

* cited by examiner

FIG. 7

USER NODE, A NETWORK NODE AND METHODS FOR WIRELESS COMMUNICATION

CROSS REFERENCE TO RELATED APPLICATIONS

This application is a continuation of International Application No. PCT/EP2017/083668, filed on Dec. 19, 2017. The aforementioned application is hereby incorporated by reference in its entirety.

TECHNICAL FIELD

Embodiments of present invention relates to the field of wireless communications, and more particularly to a user node, a network node and methods for enhancing energy consumption of the user node.

BACKGROUND

Energy consumption is an important issue in user nodes of wireless communication networks. Wireless network and user node manufacturers are constantly seeking solutions that would improve and minimize energy consumption of the user nodes. Discontinuous Reception (DRX) may be used, for example, in the Long-Term Evolution (LTE) networks to decrease energy consumption of a user equipment (UE) during periods with low data transmission activity. DXR allows discontinuous Physical Downlink Control Channel (PDCCH) monitoring for the user equipment, i.e. the user equipment wakes up periodically according to a DRX cycle and monitors the PDCCH only during a so-called "OnDuration" time. However, decreasing the energy consumption of the user equipment with LTE-like DRX algorithms leads to increased latency.

Another effort to reduce energy consumption of a user node of a wireless communication network is to use a so-called wake-up signaling concept, where a network node sends a wake-up signal at a predefined time to the user node to indicate that the network node has something to transmit to that user node. The user node should then wake-up periodically and, if it receives the wake-up signal transmitted by the network node, start monitoring downlink channel from the network node. This has also been known as advance grant indication (AGI) indicating presence of upcoming scheduling grant.

Even if using one of the above or other solutions for trying to reduce energy consumption of user nodes, there is a constant need for improved solutions that would further reduce the energy consumption of user nodes.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

It is an object of the invention to provide a solution for increasing ability to reduce energy consumption of a user node by exploiting knowledge of user node specific capabilities associated with wake-up signalling.

This objective is achieved by the features of the independent claims. Further embodiments and examples of the invention are apparent from the dependent claims, the description and the figures.

According to a first aspect, a user node is provided. The user node is configured to determine an indication of at least one wake-up latency of the user node, the at least one wake-up latency being a time period for the user node to wake-up and start to monitor a downlink channel transmitted by a network node of a wireless communication network; determine a message comprising the indication; and transmit the message to the network node. This enables at least one of reducing energy consumption of the user node, decreasing unnecessary overhead in resource allocation and avoiding erroneous allocations as the wake-up latency of the user node is known by the network node. In addition, new energy efficient ways of implementing and optimizing a transceiver architecture of user nodes in order to monitor wake-up signalling and wake-up for possible subsequent downlink channel optimally may be enabled.

In an implementation form of the first aspect, the at least one wake-up latency is a minimum supportable time by the user node between a reception of a wake-up signal from a network node and a subsequent reception of the downlink channel from the network node. This enables reducing energy consumption and avoiding erroneous allocations.

In a further implementation form of the first aspect, each of the at least one wake-up latency is associated with a different sleep mode type of the user node. This enables applying different latencies for different sleep mode types thus enabling versatility for operating the user node.

In a further implementation form of the first aspect, each of the at least one wake-up latency is associated with a different radio resource control state of the user node. This enables applying different latencies for different radio resource control states thus enabling versatility for operating the user node.

In a further implementation form of the first aspect, the indication comprises a hardcoded bit value associated with a predefined wake-up latency. This enables reducing signaling overhead as only a bit value is transmitted from the user node to the network node.

In a further implementation form of the first aspect, the user node is configured to select the at least one wake-up latency from a list of predefined wake-up latencies based on an actual wake-up latency of the user node, and wherein the indication comprises a bit value associated with the selected wake-up latency. This enables using a predefined set of latencies for all user nodes and enabling a user node to select a desired latency from the predefined set of latencies. This may further reduce the signaling overhead since the user node will only transmit a bit value of the index to the predefined list of wake-up latencies.

In a further implementation form of the first aspect, the user node is configured to determine an updated wake-up latency, wherein the determined updated wake-up latency is different from the previously indicated wake-up latency; and the user node is configured to transmit to the network node an update message comprising an indication of the updated wake-up latency of the user node. This enables a solution where the user node is able to inform the network node about a changed latency condition of the user node, and the network node is then able to adapt to the changed condition. Additionally, the user node is able to control the trade-off between latency and energy consumption. When long latency is indicated, then the user node may utilize a deep sleep state shutting down a larger part of the radio frequency components of the use node. When a short latency is indicated, the node may utilize only a light sleep state in order to enable a faster wake-up at the expense of higher sleep energy consumption.

In a further implementation form of the first aspect, the user node is configured to transmit the message in response to receiving a capability enquiry from the network node. This enables a solution where the network node receives the wake-up latency associated with the user node when the network node needs the information.

In a further implementation form of the first aspect, the user node is configured to receive from the network node a wake-up offset to be applied for the user node, the wake-up offset being a scheduled time between a reception of a wake-up signal and a subsequent reception of the downlink channel from the network node. When the user node knows the wake-up offset set by the network node, the user node is able to time a starting point of its wake-up after receiving the wake-up signal from the network node. This also reduces energy consumption and latency as the user node is ready to receive the downlink channel from the network node at the right moment. The transmission of the wake-up offset also allows various modem hardware implementations from expensive high end models to cheap low energy devices. For example, more expensive components are able to synchronize faster allowing shorter wake-ups. It may also allow a reasonable and an optimized usage of a separate wake up signal receiver.

According to a second aspect, there is provided a network node for a wireless communication network. The network node is configured to receive from a user node a message comprising an indication of at least one wake-up latency of the user node, the at least one wake-up latency being a time period for the user node to wake-up and start to monitor a downlink channel transmitted by a network node; and set a wake-up offset for the user node based on the at least one wake-up latency, the wake-up offset being a time period between a wake-up signal transmission and a subsequent downlink channel transmission from the network node to the user node. This enables at least one of reducing energy consumption of the user node, decreasing unnecessary overhead in resource allocation and avoiding erroneous allocations as the wake-up latency of the user node is known by the network node. Further, this enables the network node to take into account various wake-up times of various modem implementations of various user device types such as low energy sensors and high end mobile phones.

In an implementation form of the second aspect, the network node is configured to determine category information associated with the user node and use the category information to interpret the indication. This enables applying, for example, different latencies for user nodes of different releases. This also enables updating specifications to support different latencies related to user node modem capabilities in the future.

In a further implementation form of the second aspect, the network node is configured to transmit the wake-up offset to the user node. When the user node knows the wake-up offset set by the network node, the user node is able to time a starting point of its wake-up after receiving the wake-up signal from the network node. This also reduces energy consumption and latency as the user node is ready to receive the downlink channel from the network node at the right moment.

According to a third aspect, there is provided a method comprising determining, by a user node, an indication of at least one wake-up latency of the user node, the at least one wake-up latency being a time period for the user node to wake-up and start to monitor a downlink channel transmitted by a network node of a wireless communication network; determining, by the user node, a message comprising the indication; and transmitting, by the user node, the message to the network node. This enables at least one of reducing energy consumption of the user node, decreasing unnecessary overhead in resource allocation and avoiding erroneous allocations as the wake-up latency of the user node is known by the network node. In addition, new energy efficient ways of implementing and optimizing a transceiver architecture of user nodes in order to monitor wake-up signaling and wake-up for possible subsequent downlink channel optimally may be enabled.

In an implementation form of the third aspect, the at least one wake-up latency is a minimum supportable time by the user node between a reception of a wake-up signal from a network node and a subsequent reception of the downlink channel from the network node. This enables reducing energy consumption and avoiding erroneous allocations.

In a further implementation form of the third aspect, each of the at least one wake-up latency is associated with a different sleep mode type of the user node. This enables applying different latencies for different sleep mode types thus enabling versatility for operating the user node.

In a further implementation form of the third aspect, each of the at least one wake-up latency is associated with a different radio resource control state of the user node. This enables applying different latencies for different radio resource control states thus enabling versatility for operating the user node.

In a further implementation form of the third aspect, the indication comprises a hardcoded bit value associated with a predefined wake-up latency. This enables reducing signaling overhead as only a bit value is transmitted from the user node to the network node.

In a further implementation form of the third aspect, the method comprises selecting the at least one wake-up latency from a list of predefined wake-up latencies based on an actual wake-up latency of the user node, and wherein the indication comprises a bit value associated with the selected wake-up latency. This enables using a predefined set of latencies for all user nodes and enabling a user node to select a desired latency from the predefined set of latencies. This may further reduce the signaling overhead since the user node will only transmit a bit value of the index to the predefined list of wake-up latencies.

In a further implementation form of the third aspect, the method comprises determining an updated wake-up latency, wherein the determined updated wake-up latency is different from the previously indicated wake-up latency; and transmitting to the network node an update message comprising an indication of the updated wake-up latency of the user node. This enables a solution where the user node is able to inform the network node about a changed latency condition of the user node, and the network node is then able to adapt to the changed condition. Additionally, the user node is able to control the trade-off between latency and energy consumption. When long latency is indicated, then the user node may utilize a deep sleep state shutting down a larger part of the radio frequency components of the use node. When a short latency is indicated, the node may utilize only a light sleep state in order to enable a faster wake-up at the expense of higher sleep energy consumption.

In a further implementation form of the third aspect, the method comprises transmitting the message in response to receiving a capability enquiry from the network node. This enables a solution where the network node receives the wake-up latency associated with the user when the network node needs the information.

In a further implementation form of the third aspect, the method comprises receiving from the network node a wake-up offset to be applied for the user node, the wake-up offset being a scheduled time between a reception of a wake-up signal and a subsequent reception of the downlink channel from the network node. When the user node knows the wake-up offset set by the network node, the user node is able to time a starting point of its wake-up after receiving the wake-up signal from the network node. This also reduces energy consumption and latency as the user node is ready to receive the downlink channel from the network node at the right moment. The transmission of the wake-up offset also allows various modem hardware implementations from expensive high end models to cheap low energy devices. For example, more expensive components are able to synchronize faster allowing shorter wake-ups. It may also allow a reasonable and an optimized usage of a separate wake up signal receiver.

According to a fourth aspect, there is provided a method comprising receiving, by a network node from a user node, a message comprising an indication of at least one wake-up latency of the user node, the at least one wake-up latency being a time period for the user node to wake-up and start to monitor a downlink channel transmitted by a network node; and setting, by the network node, a wake-up offset for the user node based on the at least one wake-up latency, the wake-up offset being a time period between a wake-up signal transmission and a subsequent downlink channel transmission from the network node to the user node. This enables at least one of reducing energy consumption of the user node, decreasing unnecessary overhead in resource allocation and avoiding erroneous allocations as the wake-up latency of the user node is known by the network node. Further, this enables the network node to take into account various wake-up times of various modem implementations of various user device types such as low energy sensors and high end mobile phones.

In an implementation form of the fourth aspect, the method comprises determining category information associated with the user node and using the category information to interpret the indication. This enables applying, for example, different latencies for user nodes of different releases. This also enables updating specifications to support different latencies related to user node modem capabilities in the future.

In a further implementation form of the fourth aspect, the method comprises transmitting the wake-up offset to the user node. When the user node knows the wake-up offset set by the network node, the user node is able to time a starting point of its wake-up after receiving the wake-up signal from the network node. This also reduces energy consumption and latency as the user node is ready to receive the downlink channel from the network node at the right moment.

According to a fifth aspect, there is provided a computer program comprising a program code configured to perform a method of the third aspect, when the computer program is executed on a computing device.

According to a sixth aspect, there is provided a computer program comprising a program code configured to perform a method of the fourth aspect, when the computer program is executed on a computing device.

According to a seventh aspect, there is provided a computer-readable medium comprising a computer program comprising a program code configured to perform a method according to the third aspect, when the computer program is executed on a computing device.

According to an eight aspect, there is provided a computer-readable medium comprising a computer program comprising a program code configured to perform a method according to the fourth aspect, when the computer program is executed on a computing device.

According to a ninth aspect, a user node is provided. The user node comprises means for determining an indication of at least one wake-up latency of the user node, the at least one wake-up latency being a time period for the user node to wake-up and start to monitor a downlink channel transmitted by a network node of a wireless communication network; means for determining a message comprising the indication; and means for transmitting the message to the network node. This enables at least one of reducing energy consumption of the user node, decreasing unnecessary overhead in resource allocation and avoiding erroneous allocations as the wake-up latency of the user node is known by the network node. In addition, new energy efficient ways of implementing and optimizing a transceiver architecture of user nodes in order to monitor wake-up signaling and wake-up for possible subsequent downlink channel optimally may be enabled.

According to a tenth aspect, there is provided a network node for a wireless communication network. The network node comprises means for receiving from a user node a message comprising an indication of at least one wake-up latency of the user node, the at least one wake-up latency being a time period for the user node to wake-up and start to monitor a downlink channel transmitted by a network node; and means for setting a wake-up offset for the user node based on the at least one wake-up latency, the wake-up offset being a time period between a wake-up signal transmission and a subsequent downlink channel transmission from the network node to the user node. This enables at least one of reducing energy consumption of the user node, decreasing unnecessary overhead in resource allocation and avoiding erroneous allocations as the wake-up latency of the user node is known by the network node.

BRIEF DESCRIPTION OF THE DRAWINGS

In the following examples are described in more detail with reference to the attached figures and drawings, in which.

In the following identical reference signs refer to identical or at least functionally equivalent features.

DETAILED DESCRIPTION

In the following description, reference is made to the accompanying drawings, which form part of the disclosure, and in which are shown, by way of illustration, specific aspects and examples in which the present invention may be placed. It is understood that other aspects may be utilized and structural or logical changes may be made without departing from the scope of the present invention. The following detailed description, therefore, is not to be taken in a limiting sense, as the scope of the present invention is defined be the appended claims.

For instance, it is understood that a disclosure in connection with a described method may also hold true for a corresponding device or system configured to perform the method and vice versa. For example, if a specific method step is described, a corresponding device may include a unit or other means to perform the described method step, even if such unit is not explicitly described or illustrated in the figures. On the other hand, for example, if a specific apparatus is described based on functional units, a corresponding method may include a step performing the described functionality, even if such step is not explicitly described or illustrated in the figures. Further, it is understood that the features of the various exemplary aspects described herein may be combined with each other, unless specifically noted otherwise.

The purpose of the solution is to indicate to a network node latency requirements of a user node for waking up the user node to receive a downlink channel from the network node.

Further, although aspects and examples may be described in terms of a user node, it is by way of example and in no way a limitation. A user node, such as a user equipment (UE), may include various types of devices used directly by an end user and capable of communication in a cellular network. Furthermore, for example, in 5G networks the network node can be a gNB and it can be further divided into gNB-CU and gNB-DU(s), i.e. central unit and distributed unit. Furthermore, the network node or base station can be understood also as a transmission and reception point (TRP) that is controlled by the gNB Further, although aspects and examples may be described in terms of a network node or a base station, it is by way of example and in no way a limitation. A network node may include a base station, a Node B, an evolved Node B, a next generation Node B, or any other device of a wireless communication network.

Figure 1A:
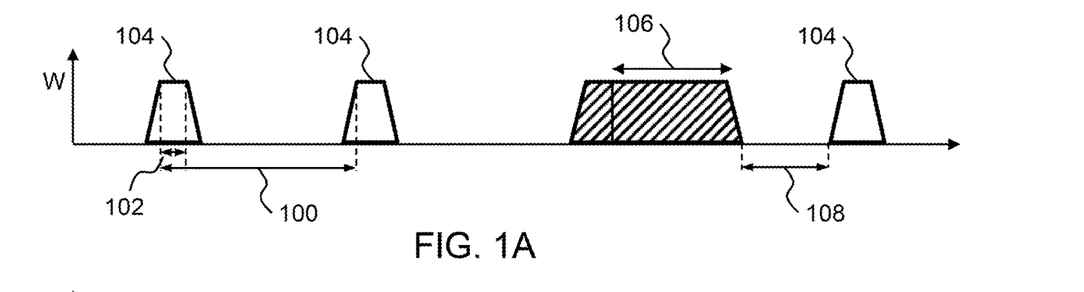
FIG. 1A illustrates discontinuous reception operation.

FIG. 1A illustrates discontinuous reception (DRX) operation. The DRX allows discontinuous Physical Downlink Control Channel (PDCCH) monitoring for a user node, for example, a user equipment (UE). The UE may wake up 104 periodically according to a DRX cycle 100, and monitor the PDCCH only during so-called "OnDuration" time 102. If the PDCCH does not indicate any data allocation, the UE goes back to sleep until a next OnDuration time 102. If the PDCCH indicates any allocation for data transmission or reception, an inactivity timer 106 may be started or restarted. When the timer is equal to "inactivity time" parameter, the UE may go to the sleep time 108 until a next OnDuration event 102. The described periodic sleep time 108 decreases the UE's energy consumption. However, decreasing the UE's energy consumption with LTE-like DRX algorithms may lead to increased latency.

Figure 1B:
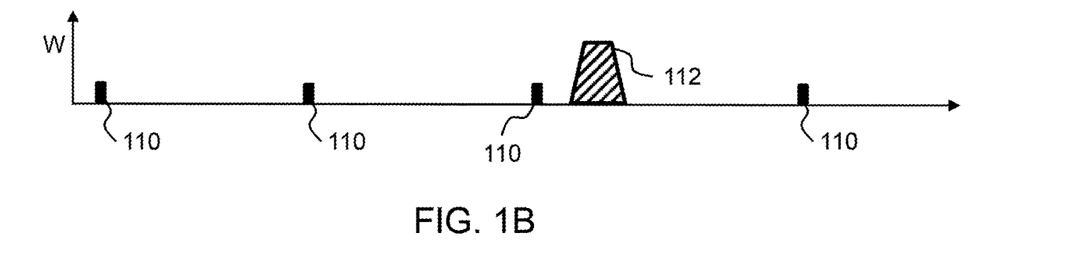
FIG. 1B illustrates operation of wake-up signaling.

FIG. 1B illustrates operation of wake-up signaling. The wake-up signaling is an energy saving technique, which may decrease latency compared to the DRX solution illustrated in FIG. 1A. The wake-up signaling may also decrease energy consumption of a user equipment by avoiding unnecessary PDCCH monitoring occasions during OnDuration time 102.

In FIG. 1B, a wake-up signal 110 is sent at a predefined time from a network node (for example, a gNB (Next generation Node B) or a eNB (evolved Node B)) to the UE to indicate that the network node has something to transmit to the UE. The UE may wake-up periodically and, if it receives the wake-up signal 110 transmitted by the network node indicating that it has something to transmit, the UE may start monitoring the PDCCH after a predefined time. An implementation of a UE modem may allow activating only the minimum functionality or use a separate low power wake-up receiver to detect the wake-up signal 110. This leads to additional energy savings, since it may skip "an empty" OnDuration 102 illustrated in FIG. 1A. However, for better resource allocation of wake-up signal 110 and to avoid unnecessary overhead, the network node should know capabilities of each UE for receiving the wake-up signal 110 and the time period the UE may spend to fully wake-up and be able to monitor 112 the PDCCH, thus being ready to receive or transmit data. The wake-up signaling has been added to various networks to allow UE to save as much energy as possible during the times the UE is not actively communicating with the network node. Further, the use of wake-up signaling allows different kind of modem hardware and software implementations for waking up and synchronizing after a sleep period. The separate low power wake-up signal receiver may be used in order to save power. On the other hand, low cost devices may use its only receiver for the wake-up signal 110. Furthermore, high-end devices with expensive hardware and fast algorithm may be able to wake-up faster than low cost Internet-of-Things (IoT) devices.

Current solutions do not allow the network node to know a wake-up latency associated with the UE. When the network does not know a wake-up latency of the UE, the network node has to assume that each UE is capable of waking-up with the same latency. The current WUS techniques do not allow different kinds of UE implementations that would allow reducing energy consumption when wake-up signaling is used.

Figure 2A:
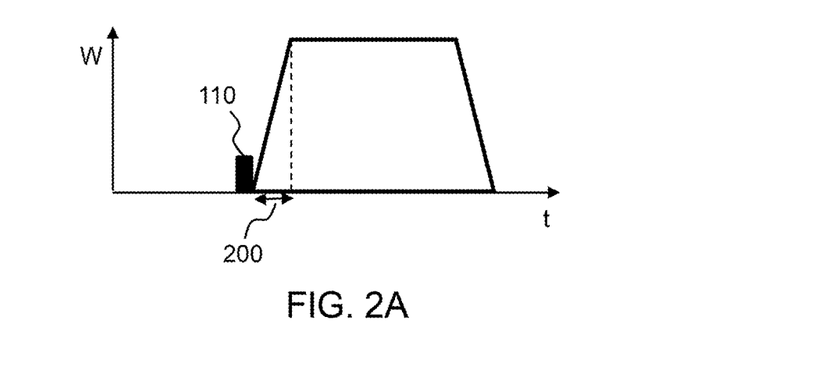
FIG. 2A illustrates an ideal allocation of wake-up signal.

FIG. 2A illustrates an example allocation of a wake-up signal 110. In this allocation, a wake-up latency 200 of user node is equal to a wake-up offset (shown with reference 202 in FIG. 2B). The wake-up latency 200 may refer to a time period for the user node to wake-up and start to monitor a downlink channel transmitted by a network node of a wireless communication network. The wake-up offset 202 may refer to a time period between the wake-up signal 110 transmission and a subsequent downlink channel transmission from the network node to the user node.

Figure 2B:
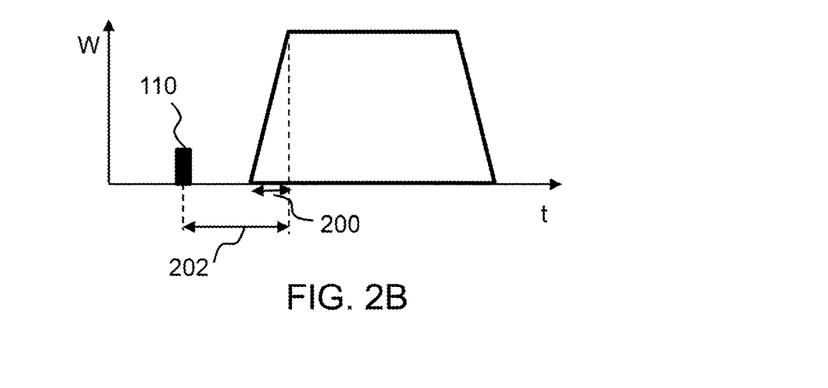
FIG. 2B illustrates a wake-up signal allocation with increased latency.

FIG. 2B illustrates another example allocation of the wake-up signal 110 where the wake-up offset 202 is bigger than the wake-up latency 200. The example allocation as illustrated in FIG. 2B may be due to a lack of knowledge about a wake-up latency 200 of the user node, and the user node has to wait an additional time after the wake-up signal 110 has been received. In some cases this example situation may occur even with perfect knowledge of the wake-up latency 200 of the user node due to the lack of free resources to allocate the PDCCH in proper time.

Figure 2C:
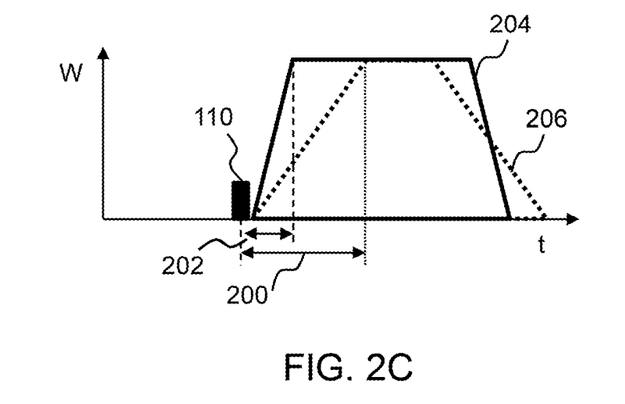
FIG. 2C illustrates an erroneous allocation of wake-up signal.

FIG. 2C illustrates an erroneous allocation of the wake-up signal 110. In this example, the wake-up offset 202 is smaller than the wake-up latency 200 required by the user node. Therefore, the user node may not have enough time to wake-up and properly receive the PDCCH. The user node may wake-up after the PDCCH transmission from the network node. In FIG. 2C, the solid trapezoid 204 illustrates the network node's expectation of the wake-up latency 200 of the user node. The dotted trapezoid 206 illustrates the real wake-up latency 200 of the user node. The user node may not be able to receive the PDCCH after wake-up and may assume that the wake-up signal 110 was a false alarm and go back to sleep.

Figure 3:
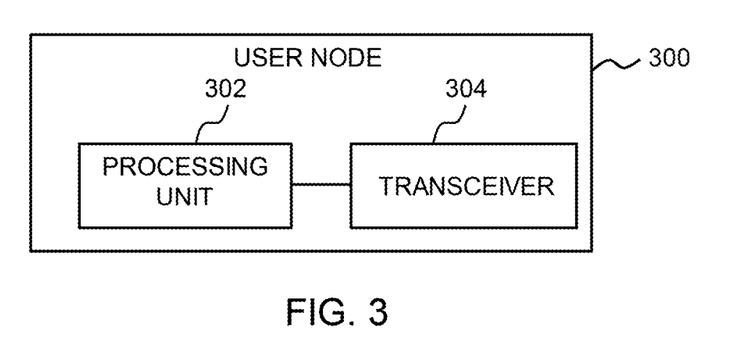
FIG. 3 illustrates a schematic representation of a user node.

FIG. 3 illustrates a schematic representation of a user node 300. According to an aspect, the user node 300 comprises a processor or a processing unit 302 and a transceiver 304 coupled to the processor 302. The user node 300 is configured to determine an indication of at least one wake-up latency 200 of the user node 300, the at least one wake-up latency 200 being a time period for the user node 300 to wake-up and start to monitor a downlink channel transmitted by a network node of a wireless communication network; determine a message comprising the indication; and transmit the message to the network node. A wake-up latency 200 may also be defined as a minimum supportable time by the user node 300 between a reception of a wake-up signal 110 from the network node and a subsequent reception of the downlink channel from the network node. In an example, the downlink channel may comprise a Physical Downlink Control Channel (PDCCH), a Physical Downlink Shared Channel (PDSCH), a Physical Broadcast Channel (PBCH), a Physical Control Format Indicator Channel (PCFICH), or a Physical Hybrid ARQ Indicator Channel (PHICH). Further, in an example, the processor 302 is configured to determine the indication of the at least one wake-up latency 200 of the user node 300 and to determine the message comprising the indication. Further, the transceiver 304 may be configured to transmit the message to the network node.

In an example, each wake-up latency of the at least one wake-up latency 200 may be associated with a different sleep mode type of the user node 300. A sleep mode type may refer, for example, to light sleep or deep sleep. The user node 300 may have in each sleep mode different wake-up latency 200 characteristics. The user node 300 may be configured to transmit a message indicating wake-up latencies associated with the sleep modes to the network node in advance. This enables applying different latencies for different sleep mode types thus enabling versatility for operating the user node 300. In another example, each wake-up latency of the at least one wake-up latency 200 is associated with different radio resource control state of the user node 300, for example, with a connected state, an idle state or an inactive state. The user node 300 may be configured to transmit a message indicating wake-up latencies associated with the radio resource control states to the network node in advance. This enables applying different latencies for different radio resource control states thus enabling versatility for operating the user node 300.

In an example, the user node 300 or the processor 302 is configured to select the at least one wake-up latency 200 from a list of predefined wake-up latencies based on an actual wake-up latency of the user node 300, and the indication then comprises a bit value associated with the selected wake-up latency 200. In other words, the user node 300 knows its wake-up latency and the wake-up latency may or may not be a direct match to one of the predefined wake-up latencies in the list. This enables using a predefined set of latencies for all user nodes and enabling each user node to select a desired latency from the predefined set of latencies. The following table shows examples of possible predefined wake-up latencies and bit values associated to them:

| No WUS support | 00 |
|---|---|
| 1 ms | 01 |
| 5 ms | 10 |
| 10 ms | 11 |

As can be seen from the table, a bit combination '00' indicates that the user node 300 does not support wake-up signaling. Further, if the actual wake-up latency 200 of the user node 300 is 5 ms, the user node 300 is configured to indicate a bit combination '10' in the message to the network node. As another example, if the actual wake-up latency 200 of the user node 300 is 7 ms, the user node 300 may be configured to indicate a next possible bit combination '11' in the message to the network node. Further, although the table above gives an example of using two bits, any other number of bits may be used.

In another example, the indication may comprise a hard-coded bit value associated with a predefined wake-up latency of the user node 300. In other words, the user node 300 has been configured to indicate a specific bit value in the message to the network node. The network node knows wake-up latencies associated with different bit values, and thus it is able determine the wake-up latency 200 associated with the specific bit value received from the user node 300. This enables reducing signaling overhead as only a bit value is transmitted from the user node to the network node.

In an example, the user node 300 or the processor 302 is configured to determine an updated wake-up latency, wherein the determined updated wake-up latency is different from the previously indicated wake-up latency. The wake-up latency may be updated, for example, when the user node 300 changes from a first sleep mode or from a first radio resource control state to a second sleep mode or a second radio resource control state. The user node 300 or the processor in then configured to transmit to the network node an update message comprising an indication of the updated wake-up latency of the user node 300. This enables a solution where the network node is able to adapt to the changed state of the user node 300.

In an example, the user node 300 or the transceiver 304 is configured to transmit the message comprising the indication in response to receiving a capability enquiry from the network node. This enables a solution where the network node receives the wake-up latency associated with the user node 300 when the network node needs the information.

Further, in an example, the user node 300 or the transceiver 304 may be configured to receive from the network node 400 a wake-up offset 202 to be applied for the user node 300, the wake-up offset 202 being a scheduled time between the reception of the wake-up signal 110 and a subsequent reception of a downlink channel from the network node. The user node 300 may then use the received wake-up offset 202 to determine when it needs to ramp up and be ready to receive the downlink channel from the network node. This reduces energy consumption and latency as the user node 300 is ready to receive the downlink channel from the network node at the right moment.

Figure 4:
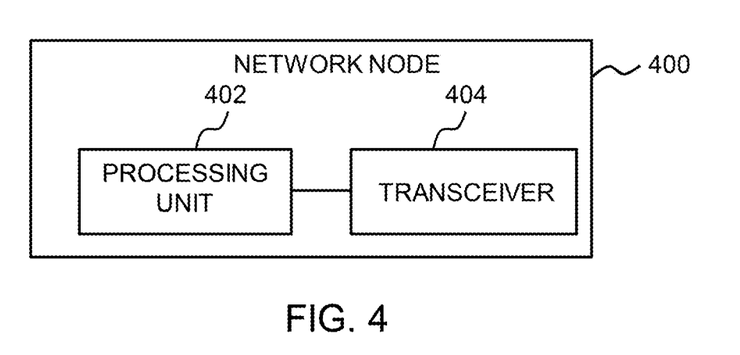
FIG. 4 illustrates a schematic representation of a network node.

FIG. 4 illustrates a schematic representation of a network node 400 for a wireless communication network. According to an aspect the network node 400 comprises a processor or a processing unit 402 and transceiver 404 coupled to the processor 402. The network node 400 is configured to receive from a user node 300 a message comprising an indication of at least one wake-up latency 200 of the user node 300, the at least one wake-up latency 200 being a time period for the user node 300 to wake-up and start to monitor a downlink channel transmitted by a network node 400; and set a wake-up offset 202 for the user node 300 based on the at least one wake-up latency 200, the wake-up offset 202 being a time period between a wake-up signal 110 transmission and a subsequent downlink channel transmission from the network node 400 to the user node 300. Further, in an example, the transceiver 404 is configured to receive the message from the user node 300 and the processor 402 is configured to set the wake-up offset 202 for the user node 300 based on the at least one wake-up latency 200. This enables at least one of reducing energy consumption of the user node 300, decreasing unnecessary overhead in resource allocation and avoiding erroneous allocations as the wake-up latency of the user node 300 is known by the network node 400.

In an example, the network node 400 or the processor 402 is configured to determine category information associated with the user node 300 and use the category information to interpret the indication of at least one wake-up latency 200 of the user node 300. In an example, the category information identifies release information associated with the user node 300. In another example, the category information may comprise a category number or a category index associated with the user node 300. Future user nodes may have better capabilities to wake up than older user nodes. Thus, instead of changing bit coding used between user nodes and network nodes, the category information associated with the user node 300 enables the network node 400 to interpret the indication received from the user node 300 correctly. This enables applying different latencies for user nodes of different releases.

In an example, the network node 400 or the transceiver 404 is configured to transmit the wake-up offset 202 to the user node 300. When the user node 300 knows the wake-up offset 202 set by the network node 400, the user node 300 is able to time a starting point of its wake-up after receiving the wake-up signal 110 from the network node 400. This also reduces energy consumption and latency as the user node 300 is ready to receive the downlink channel from the network node 400 at the right moment. Further, the user node 300 may use the wake-up offset when deciding a sleep state of the user node 300. If the wake-up offset is short, the user node 300 may not be able to shut down as big part of its radio frequency component than in a situation in which the wake-up offset is longer.

Figure 5:
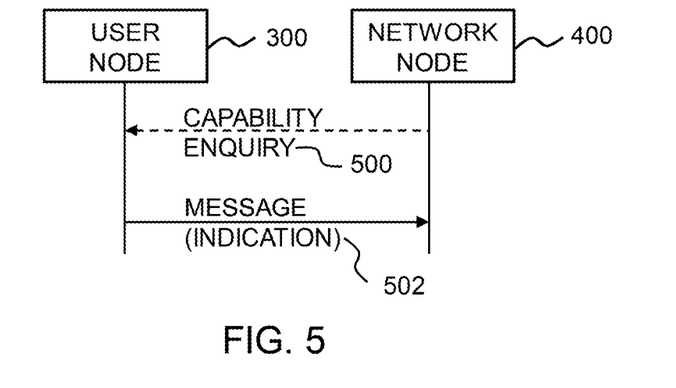
FIG. 5 illustrates a flowchart of a procedure of receive user node capability information by a network node.

FIG. 5 illustrates a flowchart of a procedure of receive user node 300 capability information by a network node 400. When the network node 400 requires knowing the latency capability of the user node 300, it sends a capability enquiry 500 to the user node 300. The user node 300 then sends a message 502 in response to the enquiry to the network node 400, for example, via a radio resource control message comprising an indication of at least one wake-up latency 200 of the user node 300. The indication is, in one example, a bit value associated with the wake-up latency 200 of the user node 300. The procedure illustrated in FIG. 5 may be performed only once during a registration of the user node 300. Alternatively, the procedure may be performed multiple times.

The message 502 may, for example, be sent via a featureGroupIndicators field in the IE UE-EUTRA-Capability message transmitted from the user node 300 to the network node 400, or via any other message or a suitable way.

Figure 6:
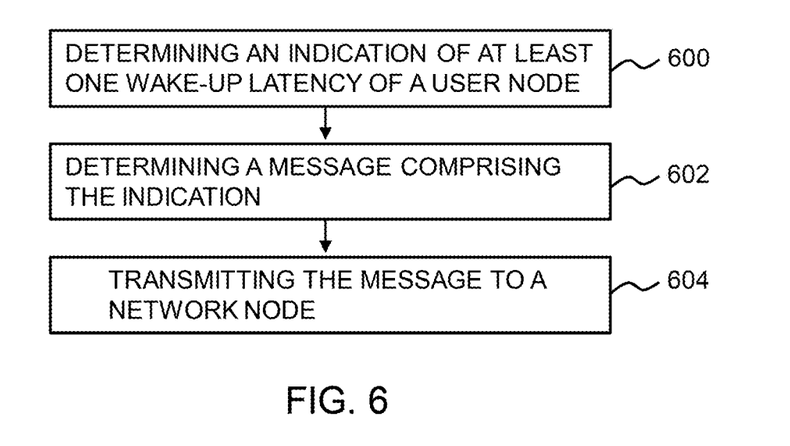
FIG. 6 illustrates a flowchart of method for providing an indication associated with at least one wake-up latency to a network node.

FIG. 6 illustrates a flowchart of method for providing an indication associated with at least one wake-up latency 200 of the user node 300 to a network node 400. At 600 an indication of at least one wake-up latency 200 of a user node 300 is determined, the at least one wake-up latency 200 being a time period for the user node 300 to wake-up and start to monitor a downlink channel transmitted by a network node 400 of a wireless communication network. At 602 a message comprising the indication is determined. At 604 the message is sent to the network node 400. The method illustrated in FIG. 6 may be implemented by the user node 300 discussed in more detail with reference to FIG. 3. Further, the user node 300 may comprise a memory or memories storing at least one computer program comprising instructions that when executed by the processing unit or processor 300, cause the user node 300 to perform the method.

Figure 7:
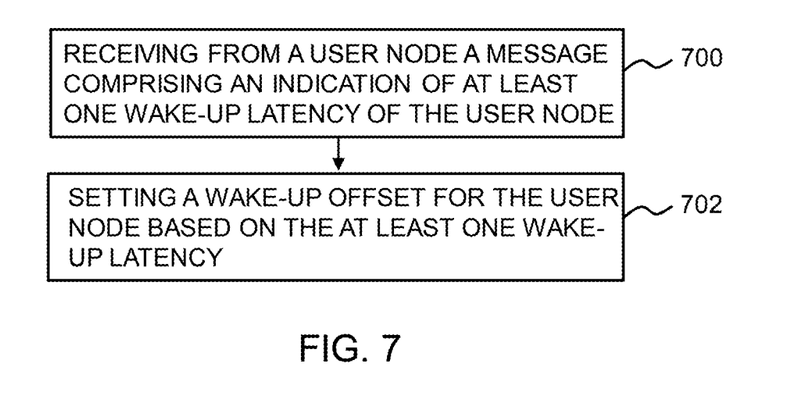
FIG. 7 illustrates a flowchart of method setting a wake-up offset for a user node.

FIG. 7 illustrates a flowchart of method setting a wake-up offset 202 for a user node 300. At 700 a message comprising an indication of at least one wake-up latency 200 of a user node 300 is received from the user node 300, the at least one wake-up latency 200 being a time period for the user node 300 to wake-up and start to monitor a downlink channel transmitted by a network node 400. At a wake-up offset 202 is set for the user node 300 based on the at least one wake-up latency 200, the wake-up offset 202 being a time between a wake-up signal 110 transmission and a subsequent downlink channel transmission from the network node 400 to the user node 300. The method illustrated in FIG. 7 may be implemented by the network node 400 discussed in more detail with reference to FIG. 4. Further, the network node 400 may comprise a memory or memories storing at least one computer program comprising instructions that when executed by the processing unit or processor 400, cause the network node 400 to perform the method.

The disclosed aspects and examples allow various hardware and algorithm implementations for different purposes. For example, some user nodes may have a separate low-power wake-up receiver for wake-up signaling and they then wake-up a separate main receiver after a wake-up signal 110 has been detected. Other user nodes may wake-up a bigger part of the user node 300 hardware before the wake-up signal 110, thus making them able to receive a subsequent PDCCH transmission earlier. The disclosed aspects and examples may also avoid situations where the network node 400 may set the wake-up offset 202 lower than time the user node 300 is able to perform. Further, in optimization algorithms where the network node 400 may set different wake-up offsets for different user nodes, the network node 400 may be able to take the minimum wake-up offset from the latency indications from the user nodes.

The functionality described herein can be performed, at least in part, by one or more computer program product components such as software components. According to an example, the user node 300 and/or the network node 400 may comprise a processor configured by the program code when executed to execute the examples and embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

The functionality of the user node 300 and/or the network node 400 may be implemented by program instructions stored on a computer readable medium. The program instructions, when executed, cause the computer, processor or the like, to perform the steps of the encoding and/or decoding methods. The computer readable medium can be any medium, including non-transitory storage media, on which the program is stored such as a Blu-Ray disc, DVD, CD, USB (flash) drive, hard disc, server storage available via a network, a ROM, a PROM, an EPROM, an EEPROM or a Flash memory having electronically readable control signals stored thereon which cooperate or are capable of cooperating with a programmable computer system such that an embodiment of at least one of the inventive methods is performed. An embodiment of the invention comprises or is a computer program comprising program code for performing any of the methods described herein, when executed on a computer. Another example of the invention comprises or is a computer readable medium comprising a program code that, when executed by a processor, causes a computer system to perform any of the methods described herein.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one example or may relate to several examples. The examples are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method, blocks or elements identified, but that such blocks or elements do not comprise an exclusive list and a method or apparatus may contain additional blocks or elements.

Although the invention and its advantages have been described in detail with reference to specific features and embodiments thereof, it is evident that various changes, modifications, substitutions, combinations and alterations can be made thereto without departing from the spirit and scope of the invention as defined by the appended claims. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A user node comprising:
   a processor; and
   a memory having processor-executable instructions stored to be executed by the processor,
   wherein the processor-executable instructions cause the processor to:
   determine an indication of at least one wake-up latency of the user node, the at least one wake-up latency being a time period for the user node to wake up and start to monitor a downlink channel transmitted by a network node of a wireless communication network;
   select the at least one wake-up latency from a list of predefined wake-up latencies based on an actual wake-up latency of the user node, wherein the indication comprises a bit value associated with the selected wake-up latency, and wherein a bit combination of "00" indicates that the user node does not support wake-up signaling;
   determine a message comprising the indication; and
   transmit the message to the network node.

2. The user node of claim 1, wherein the at least one wake-up latency is a minimum supportable time by the user node between a reception of a wake-up signal from the network node and a subsequent reception of the downlink channel from the network node.

3. The user node of claim 1, wherein each of the at least one wake-up latency is associated with a different sleep mode type of the user node.

4. The user node of claim 1, wherein each of the at least one wake-up latency is associated with a different radio resource control state of the user node.

5. The user node of claim 1, wherein the processor is further configured to:
   determine an updated wake-up latency, wherein the determined updated wake-up latency is different from a previously indicated wake-up latency; and
   transmit to the network node an update message comprising an indication of the updated wake-up latency of the user node.

6. The user node of claim 1, wherein the processor is further configured to transmit the message in response to receiving a capability enquiry from the network node.

7. The user node of claim 1, wherein the user node is configured to receive from the network node a wake-up offset to be applied for the user node, the wake-up offset being a scheduled time between a reception of a wake-up signal and a subsequent reception of the downlink channel from the network node.

8. A network node for a wireless communication network, the network node comprising:
   a processor; and
   a memory having processor-executable instructions stored to be executed by the processor,
   wherein the processor-executable instructions cause the processor to:
   receive from a user node a message comprising an indication of at least one wake-up latency of the user node, the at least one wake-up latency being a time period for the user node to wake up and start to monitor a downlink channel transmitted by a network node, wherein the indication comprises a bit value associated with a selected wake-up latency from a list of predefined wake-up latencies based on an actual wake-up latency of the user node, and wherein a bit combination of "00" indicates that the user node does not support wake-up signaling; and
   set a wake-up offset for the user node based on the at least one wake-up latency, the wake-up offset being a time period between a wake-up signal transmission and a subsequent downlink channel transmission from the network node to the user node.

9. The network node of claim 8, wherein the processor is further configured to determine category information associated with the user node and use the category information to interpret the indication.

10. The network node of claim 8, wherein the processor is further configured to: transmit the wake-up offset to the user node.

11. A method comprising:
   determining, by a user node, an indication of at least one wake-up latency of the user node, the at least one wake-up latency being a time period for the user node to wake up and start to monitor a downlink channel transmitted by a network node of a wireless communication network;
   selecting the at least one wake-up latency from a list of predefined wake-up latencies based on an actual wake-up latency of the user node, wherein the indication comprises a bit value associated with the selected wake-up latency, and wherein a bit combination of "00" indicates that the user node does not support wake-up signaling;
   determining, by the user node, a message comprising the indication; and
   transmitting, by the user node, the message to the network node.

12. A non-transitory computer-readable storage medium having processor-executable instructions stored to be executed by a processor of a user node, wherein the processor-executable instructions cause the processor to implement the method according to claim 11.

13. The method of claim 11, wherein the at least one wake-up latency is a minimum supportable time by the user node between a reception of a wake-up signal from the network node and a subsequent reception of the downlink channel from the network node.

14. The method of claim 11, wherein each of the at least one wake-up latency is associated with a different sleep mode type of the user node.

15. The method of claim 11, wherein each of the at least one wake-up latency is associated with a different radio resource control state of the user node.

16. A method comprising:
   receiving, by a network node from a user node, a message comprising an indication of at least one wake-up latency of the user node, the at least one wake-up latency being a time period for the user node to wake up and start to monitor a downlink channel transmitted by a network node; and
   setting, by the network node, a wake-up offset for the user node based on the at least one wake-up latency, the wake-up offset being a time between a wake-up signal transmission and a subsequent downlink channel transmission from the network node to the user node, wherein the indication comprises a bit value associated with a selected wake-up latency from a list of predefined wake-up latencies based on an actual wake-up latency of the user node, and wherein a bit combination of "00" indicates that the user node does not support wake-up signaling.

17. The method of claim 16, further comprising: determining category information associated with the user node and using the category information to interpret the indication.

18. The method of claim 16, further comprising: transmitting the wake-up offset to the user node.

* * * * *